United States Patent
Vandevelde et al.

(10) Patent No.: US 9,988,575 B2
(45) Date of Patent: Jun. 5, 2018

(54) POLYURETHANE FOAM FOR USE AS SOIL IMPROVER

(71) Applicant: Huntsman International LLC, The Woodlands, TX (US)

(72) Inventors: Annelies Vandevelde, Gingelom (BE); Herman Eugene Germain Moureau, Tienen (BE); Fabio Invernizzi, Brussels (BE); Robert Weggelaar, Tarragona (ES)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 179 days.

(21) Appl. No.: 14/895,004

(22) PCT Filed: May 26, 2014

(86) PCT No.: PCT/EP2014/060795
§ 371 (c)(1),
(2) Date: Dec. 1, 2015

(87) PCT Pub. No.: WO2014/206667
PCT Pub. Date: Dec. 31, 2014

(65) Prior Publication Data
US 2016/0115387 A1    Apr. 28, 2016

(30) Foreign Application Priority Data

Jun. 24, 2013 (EP) .................................... 13173338

(51) Int. Cl.
*C09K 17/30* (2006.01)
*C05G 3/04* (2006.01)
(Continued)

(52) U.S. Cl.
CPC .............. *C09K 17/30* (2013.01); *C05F 11/02* (2013.01); *C05G 3/04* (2013.01); *C08G 18/161* (2013.01); *C08G 18/1825* (2013.01); *C08G 18/1833* (2013.01); *C08G 18/4804* (2013.01); *C08G 18/4837* (2013.01); *C08G 18/7664* (2013.01); *C08G 18/7671* (2013.01); *A01G 24/48* (2018.02); *C08G 2101/005* (2013.01); *C08G 2101/0083* (2013.01); *C08G 2310/00* (2013.01);
(Continued)

(58) Field of Classification Search
USPC ........................................ 71/11; 47/58.1 SC
See application file for complete search history.

(56) References Cited

U.S. PATENT DOCUMENTS 3,367,892 A * 2/1968 Jorczak .................. C08G 18/10
166/295
3,373,009 A * 3/1968 Pruitt ....................... C05D 9/00
47/74
(Continued)

FOREIGN PATENT DOCUMENTS

DE         2044191      *  3/1972
GB         1 318 736        5/1973
(Continued)

*Primary Examiner* — Wayne Langel
(74) *Attorney, Agent, or Firm* — Huntsman International LLC; Robert Diaz (57) ABSTRACT

Polyurethane foam flakes for use as additive to soil and/or other natural plant growth media for improving the water retention and/or reduction of the methane emission.

12 Claims, 4 Drawing Sheets

(51) Int. Cl.
*C05F 11/02* (2006.01)
*C08G 18/76* (2006.01)
*C08G 18/48* (2006.01)
*C08G 18/16* (2006.01)
*C08G 18/18* (2006.01)
*C08G 101/00* (2006.01)

(52) U.S. Cl.
CPC .............. *Y02E 50/343* (2013.01); *Y02P 60/22* (2015.11); *Y02W 30/47* (2015.05)

(56) References Cited

U.S. PATENT DOCUMENTS

| | | | |
|---|---|---|---|
| 3,798,836 | A | 3/1974 | Rubens et al. |
| 3,889,417 | A | 6/1975 | Wood et al. |
| 3,970,618 | A | 7/1976 | Jabs et al. |
| 4,439,552 | A * | 3/1984 | Dedolph ................ A01G 31/02 521/159 |
| 4,495,310 | A * | 1/1985 | Dedolph ................ A01G 31/02 210/728 |
| 5,155,931 | A | 10/1992 | Vansteenkiste et al. |
| 5,591,779 | A | 1/1997 | Bleys et al. |
| 6,240,674 | B1 | 6/2001 | Otake et al. |
| 6,271,274 | B1 | 8/2001 | Sano |
| 6,460,473 | B1 | 10/2002 | Onodera et al. |
| 6,479,433 | B1 | 11/2002 | Hann et al. |
| 8,844,240 | B2 * | 9/2014 | Kuchel ................... C09K 17/30 405/269 |
| 2005/0081767 | A1* | 4/2005 | Pedrazzoli ............. C09K 17/30 111/200 |
| 2006/0150496 | A1 | 7/2006 | Blaakmeer et al. |
| 2010/0236309 | A1* | 9/2010 | Celia ........................ C05G 3/04 71/23 |
| 2012/0277117 | A1 | 11/2012 | Zayed et al. |
| 2013/0150477 | A1* | 6/2013 | Celia ........................ C08L 75/04 521/170 |

FOREIGN PATENT DOCUMENTS

| | | | |
|---|---|---|---|
| WO | 2011/042284 | * | 4/2011 |
| WO | 2013/060779 | | 5/2013 |

* cited by examiner

POLYURETHANE FOAM FOR USE AS SOIL IMPROVER

This application is the National Phase of International Application PCT/EP2014/060795 filed May 26, 2014 which designated the U.S. and which claims priority to Foreign Application No. 13173338.8 filed Jun. 24, 2013. The noted applications are incorporated herein by reference.

FIELD OF INVENTION

The present invention is related to the use of a polyurethane foam as an additive in plant growth substrates in order to improve e.g. the water uptake and water retention within the plant substrate.

More in particular the present invention relates to polyurethane flakes which can be added to soil or other natural plant growth media in order to improve the water uptake and water retention within the plant growth substrate.

The polyurethane foam, more in particular polyurethane flakes of the present invention can be used as additive in plant growth substrates for growing plants such as vegetables and hanging fruit thereby increasing significantly the yield of fruit and vegetables.

The polyurethane foam, more in particular polyurethane flakes of the present invention can be used as additive in plant growth substrates for growing rice plants thereby reducing significantly the emission of methane gas (reduce greenhouse gas emissions).

BACKGROUND OF THE INVENTION

Plant growth media comprising polyurethane foams are known.

EP 939092 discloses open cell polyisocyanurate foams for fixing and supporting plants.

U.S. Pat. No. 3,798,836 discloses a water insoluble open celled foamed polyurethane matrix having dispersed therein thermoplastic particles.

U.S. Pat. No. 3,889,417 makes a hydrophilic foam by reacting a prepolymer with a high amount of water. This foam may be used in horticultural applications. The water index applied is 1300-78000. A similar process has been disclosed in WO 96/16099 wherein no special guidance as to the isocyanate index and the water index has been given; in the examples the water index was more than 1700 and the isocyanate index was less than 6. The prepolymers used are made from polyols having a molecular weight of at least 1000.

U.S. Pat. No. 3,970,618 discloses a substrate for cultivating plants which substrate is a low density (18 kg/m$^3$) hydrophilic polyurethane foam made by reacting a polyisocyanate and a polyol at a low NCO index, the polyol having an hydroxyl value of 900-1800 and the polyisocyanate being a toluene diisocyanate (TDI) type polyisocyanate.

U.S. Pat. No. 5,155,931 uses a foam as plant mat, which foam is made by reacting an organic isocyanate, which preferably is TDI, and a polyol at an NCO-index of 90-120.

U.S. Pat. No. 6,479,433 discloses a horticultural growing medium made by reacting a prepolymer and water in the presence of a selected filler material.

WO2011/042284 describes flexible polyurethane foams for use as plant substrates. These foams have a density of 25-70 kg/m$^3$, a compression load deflection at 40% (CLD) of 5-15 kPa and a volume increase at water saturation of at most 25%. These foams are made at a low isocyanate index of 20-70 and at a high water index of 200-400 which means that there is a huge competition between the isocyanate reactive components in the formulation to react with the available isocyanate components which may lead to frothing (of the draining water) when the foam is used as substrate material.

U.S. Pat. No. 6,460,473 and EP 823203 disclose the use of low density, flexible polyurethane foam for raising rice seedlings.

In WO 2010/099431 a hydroponic apparatus has been disclosed for screening plants. Amongst others rice has been mentioned and polyurethane may be used as germination substrate.

The above cited prior art does not touch upon serious environmental problems associated with the traditional way of rice cultivation wherein methane gas is liberated from the cultivation environment and a solution to reduce the emission of methane gas.

Further the prior art does not disclose polyurethane foam (pieces) suitable for mixing in soil or other natural plant substrates in order to improve the water retention of the soil and hence reduce the amount of water required to grow plants or plant crops (tomatoes, wheat, grass and olives) in e.g. semi-arid and arid climate conditions where the available water is limited while at the same time improve or at least maintaining the yield of the plants.

SUMMARY OF THE INVENTION

According to the invention, a plant growth substrate is disclosed, said plant growth substrate comprising soil and/or other natural growth media and polyurethane foam flakes as additive.

According to embodiments, the polyurethane flakes are made from a polyurethane foam having a density of 25-100 kg/m$^3$, a compression load deflection (CLD) at 40% of 5-50 kPa, a volume increase at water saturation of at most 25% and a water buffer capacity of 35-80% and wherein the flakes have dimensions in the range 0.1-100 mm.

According to embodiments, the polyurethane foam used to make the flakes according to the invention has a CLD in the range 5-15 kPa, a free-rise core density of 25 up to 70 kg/m$^3$, and a water buffer capacity of 40-60%.

According to embodiments, the polyurethane foam used to make the flakes according to the invention has a CLD of at least 20 kPa, preferably at least 25 kPa, a free-rise core density of 20 up to 50 kg/m$^3$, a resilience of at most 30% and the volume increase at water saturation is at most 20%.

According to embodiments, the polyurethane foam used to make the flakes according to the invention has a resilience of at most 40%, preferably at most 30%, a compression load deflection (CLD) at 40% of at least 16 kPa, preferably at least 20 kPa and more preferably at least 25 kPa, a free-rise core density of at least 20 kg/m$^3$, preferably 20 up to 50 kg/m$^3$ and a volume increase at water saturation of at most 25%, preferably is most 20%.

According to embodiments, the flakes according to the invention preferably have dimensions in the range of 1-50 mm, preferably 10-30 mm, more preferably 12-20 mm.

According to embodiments, the flakes according to the invention may be coated with additives such as fertilizers, hardeners, . . . .

According to embodiments, the polyurethane flakes are present in the plant growth substrate in an amount of 15-60 volume % polyurethane flakes, preferably 15-50 volume % and more preferably 20-30 volume % calculated as volume flakes on the total volume of plant growth substrate (comprising flakes and soil and/or other natural growth media).

According to embodiments the use of the plant growth substrate according to the invention wherein polyurethane foam flakes are present in the plant growth substrate in an amount of 15-60 volume % polyurethane flakes, preferably 15-50 volume % and more preferably 20-30 volume % calculated as volume flakes on the total volume of plant growth substrate for growing plants under aerobic conditions is disclosed.

According to embodiments the use of the plant growth substrate according to the invention wherein polyurethane foam flakes are present in the plant growth substrate in an amount of 15-60 volume % polyurethane flakes, preferably 15-50 volume % and more preferably 20-30 volume % calculated as volume flakes on the total volume of plant growth substrate for improving the water retention of the plant growth substrate by adding the polyurethane flakes to soil and/or other natural growth media.

According to embodiments, the polyurethane flakes are present in the plant growth substrate such that the volume ratio of the foam flakes in the plant growth substrate is ranging from 10:90 to 90:10 (volume %), preferably from 80:20 to 40:60 (volume %).

According to embodiments the use of the plant growth substrate according to the invention wherein polyurethane foam flakes are present in the plant growth substrate such that the volume ratio of the foam flakes in the plant growth substrate is ranging from 10:90 to 90:10 (volume %), preferably from 80:20 to 40:60 (volume %) is disclosed for reducing the emission of methane and other greenhouse gasses.

According to embodiments, the use of the plant growth substrate according to the invention for reducing the emission of methane is used for cultivating rice, said process comprising allowing rice to grow in a mixture of water, nutrients, polyurethane foam flakes according to any of claims 1-6 and soil wherein the volume ratio of the foam flakes in the plant growth substrate is ranging from 10:90 to 90:10 (volume %), preferably from 80:20 to 40:60 (volume %).

The independent and dependent claims set out particular and preferred features of the invention. Features from the dependent claims may be combined with features of the independent or other dependent claims as appropriate.

The above and other characteristics, features and advantages of the present invention will become apparent from the following detailed description, taken in conjunction with the accompanying drawings, which illustrate, by way of example, the principles of the invention.

Definitions and Terms

In the context of the present application the following terms have the following meaning:

1) isocyanate index or NCO index or index:
the ratio of NCO-groups over isocyanate-reactive hydrogen atoms present in a formulation, given as a percentage:

$$\frac{[NCO] \times 100}{[\text{active hydrogen}]} (\%).$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual foaming process involving the isocyanate ingredient and the isocyanate-reactive ingredients used in that reaction step. Only the free isocyanate groups and the free isocyanate-reactive hydrogens (including those of the water) present at the actual foaming stage are taken into account.

Water index is the ratio 100Y/X (%) wherein Y is the amount of water in grams actually used in a formulation and X is the total amount of water in grams theoretically needed in the same formulation so as to obtain an isocyanate index of 100.

2) The expression "isocyanate-reactive hydrogen atoms" as used herein for the purpose of calculating the isocyanate index refers to the total of hydroxyl and amine hydrogen atoms present in the reactive compositions in the form of polyols, polyamines and/or water. This means that for the purpose of calculating the isocyanate index at the actual foaming process one hydroxyl group is considered to comprise one reactive hydrogen and one water molecule is considered to comprise two active hydrogens.

3) The expression "polyurethane foams" as used herein generally refers to cellular products as obtained by reacting polyisocyanates with isocyanate-reactive hydrogen containing compounds, using foaming agents, and in particular includes cellular products obtained with water as reactive foaming agent (involving a reaction of water with isocyanate groups yielding urea linkages and carbon dioxide and producing polyurea-polyurethane foams).

4) The term "nominal hydroxyl functionality" or "nominal functionality" or "hydroxyl functionality" is used herein to indicate the functionality (number of hydroxyl groups per molecule) of the polyol composition on the assumption that this is the functionality (number of active hydrogen atoms per molecule) of the initiator(s) used in their preparation although in practice it will often be somewhat less because of some terminal unsaturation. The term "equivalent weight" refers to the molecular weight per isocyanate reactive hydrogen atom in the molecule.

5) The word "average" refers to "number average".

6) "Density" is measured on foam samples made under atmospheric conditions without use of auxiliary blowing agents and according to ISO 845.

7) "Hardness" CLD: compression load deflection at 40% measured according to ISO 3386/1 with the proviso that the hardness is measured on dry and non-crushed samples during the first cycle.

8) "Foam swelling ΔV" is the volume increase of foam samples at 100% water saturation, in %:

$$\Delta V = \frac{V_1 - V_2}{V_2} \times 100(\%)$$

wherein $V_2$ is the volume of the foam without water intake and $V_1$ is the volume of the foam at maximal water absorption both at 23° C. and 50% relative humidity. In order to determine $V_1$, the foam is immersed in water for 24 h at ambient pressure and 23° C.

9) "Resilience" is measured according to ISO 8307 with the proviso that the resilience is measured on dry and non-crushed samples.

10) "Water retention values" are measured in this invention by means of pF values. In the context of the invention pF values correspond to water volumes retained in the foam after immersing a foam sample in water for a predefined period to achieve a water saturated foam sample and then subjecting the water saturated foam to different under pressures for a predefined period. In a pF curve the measured volumetric water content retained in the foam is plotted on the Y-axis, against the applied under pressure on the (negative) X-axis. On the pF curve a $pF_0$ value corresponds to a volume of water retained in a water saturated foam sample after subjecting said foam sample for a predefined period to a pressure of 0 cm $H_2O$ column. On the pF curve a $pF_1$ value corresponds to a volume of water retained in a water saturated foam sample after subjecting said foam sample for a predefined period to a pressure of −10 cm $H_2O$ column. On the pF curve a $pF_{1.5}$ value corresponds to a volume of water retained in a water saturated foam sample after subjecting said foam sample for a predefined period to a pressure of −32 cm $H_2O$ column.

$pF_0$ and $pF_1$ values taken from the pF curve are suitable to calculate the water retention and hence availability of water in a polyurethane foam. $pF_0$ and $pF_1$ are further defined as $$pF_0 = \frac{V_u}{V_f} \times 100(\%)$$

$$pF_1 = \frac{V_{r-1}}{V_f} \times 100(\%)$$

wherein $V_f$ is the initial volume (in ml) of a (dry) foam sample, $V_u$ is the water uptake (meaning the volume of water retained in a water saturated foam sample after subjecting said foam sample for a predefined period to a pressure of 0 cm $H_2O$ column) in ml of the foam sample when saturated with water and $V_{r-1}$ is the volume of the water retained in ml after subjecting the water saturated foam sample to a pressure of −10 cm $H_2O$ column for a predefined period.

$V_f$, $V_u$ and $V_{r-1}$ are determined as follows: a foam sample is cut to obtain indicated dimensions such as 100×120×75 mm or 100×120×60 mm (length×width×height). Hence $V_f$ of the sample is 900 ml or 720 ml. The dry weight of the foam sample is determined at 105° C. Then the foam sample is immersed for a predefined period of 6 hours at atmospheric pressure and 23° C. in a water bath in such a way that 1 cm of the sample in the height direction extends above the water surface.

Then the sample is immersed completely in the water bath for 18 hours at atmospheric pressure and 23° C. Subsequently the sample is placed on a sieve with a mesh of 0.5-1 cm at the same pressure and temperature and allowed to release water for 30 minutes. Finally the weight of the foam sample (containing the remaining water) is determined again and $V_u$ is calculated, assuming a density of the $H_2O$ of 1 kg/dm³.

Then the water saturated sample is placed for 24 h in a closed environment at 23° C. and a sub-atmospheric pressure is applied to the bottom surface of the sample (for example to a pressure of −10 cm $H_2O$ column measured from the half height of the foam sample in order to measure $pF_1$).

Finally the weight of the sample is determined again and the volume $V_{r-1}$ of water retained in the sample is calculated (assuming a water density of 1 kg/dm³).

A device which may be used to measure pF values and suitable to create a sub-atmospheric environment on the bottom surface of the sample is a so-called Sandbox obtainable from the Dutch firm Eijkelkamp (www.eijkelkamp.com) and is used for pF-determinations.

Calculation of the water content on volume basis is also described in ISO 11274 for soil samples after subjecting the soil samples to a metric pressure (see section 5.5) and can also be applied to calculate the water content in the foam samples of the present invention. The metric pressure refers here to the applied under pressure in cm $H_2O$ column.

11) "Water buffer capacity (WBC, %)" may be defined as $pF_0-pF_{1.5}$ (also referred to in prior art as $\Phi_0-\Phi_{32}$), wherein $$pF_0 = \Phi_0 = \frac{V_u}{V_f} \times 100(\%) \text{ and}$$

$$pF_{1.5} = \Phi_{32} = \frac{V_{r-1.5}}{V_f} \times 100(\%),$$

and wherein $V_f$ is the initial volume (in ml) of a (dry) foam sample, $V_u$ is the water uptake (in ml) of the foam sample when saturated with water and $V_{r-1.5}$ is the volume of the water retained after subjecting the water saturated foam sample to a pressure of −32 cm $H_2O$ column for a predefined period in ml. $V_f$, $V_u$ and $V_{r-1.5}$ are determined as described in 10) 12) The "unsaturation" of the polyol mixture which is used in the process according to the present invention, expressed in meq/g (milli-equivalents of unsaturated groups per gram of polyol), is determined by ISO 17710.

13) "Aerobic conditions" means in the presence of oxygen or growing in the presence of oxygen. Aerobic soils have oxygenated air to carry out oxidative reactions, such as soil organic matter decomposition and nutrient cycling. Most natural occurring soils are aerobic.

14) "Anaerobic conditions" means in the absence of oxygen or growing in the absence of oxygen. Soils that are flooded or saturated with water have anaerobic conditions because they have almost no oxygenated air to carry out oxidative reactions. A "hydric soil" e.g. used in rice fields is a soil that is formed under conditions of saturation, flooding, or pending long enough during the growing season to develop anaerobic conditions in the upper part.

15) "Rebonded polyurethane foam flakes" is a polyurethane foam according to the invention that is first shredded into polyurethane foam flakes and subsequently coated with a polyisocyanate (or prepolymer) based binder formulation which includes e.g. methylene diisocyanate and then compressed and cured.

16) "Plant growth substrate" refers to a substrate suitable for growing plants, this substrate contains at least soil and/or other natural plant growth media. Natural plant growth media and soil are hence regarded here as main components of the plant growth substrate. The plant growth substrate according to the invention always contains polyurethane foam flakes as an additional component in the plant growth substrate.

DETAILED DESCRIPTION

Surprisingly we have found a way to improve the water retention of soil (or other natural media) and at the same time reduce the amount of water required for growing plants. This is achieved by using a combination of a certain polyurethane foam and soil (or other natural growth media), in particular by adding and/or mixing flakes (pieces having a predefined dimension) of a specific developed polyurethane foam in a specific amount to the soil (or other natural growth media). This is referred to in the detailed description below as the use of polyurethane foam flakes in a plant growth substrate under "aerobic conditions".

Surprisingly we have found a way to reduce the amount of methane production associated with traditional rice cultivation. This is achieved by a combination of a certain polyurethane foam and soil (or other natural growth media), in particular by adding and/or mixing flakes (pieces having a predefined dimension) of a specific developed polyurethane foam in a specific amount to the soil in cultivating rice. The use of the foam flakes additionally may lead towards a more economical water consumption associated with rice cultivation. This is also referred to in the detailed description below as the use of polyurethane foam flakes in a plant growth substrate under "anaerobic conditions".

The polyurethane flakes of the present invention may be in the form of crumbs or flakes, or any other regularly or irregularly formed pieces of different or the same size or in any other suitable form. Generally the average particle size of the flakes will be between 0.1-100 mm, preferably in the range 1-50 mm (smaller or equal to 50 mm), more preferably in the range of 10-30 mm, and most preferably 12-20 mm. Flakes having a mean diameter in the range of 15 mm are ideally suitable for mixing with soil and/or other natural substrates.

According to embodiments, the polyurethane flakes according to the invention may be rebonded (rebonded flakes) to form a sheet which can be in the form of a flat sheet or an eggshell shaped sheet. This form of rebonded flakes may be very useful in applications where the strength and hardness of the plant medium is important, for example for use in green roof applications.

According to embodiments, the amount of polyurethane foam flakes for use in aerobic conditions is such that the flakes are present in the plant growth substrate in an amount of 15-60 volume % polyurethane flakes, preferably 15-50 volume % and more preferably 20-30 volume % calculated as volume flakes on the total volume of plant growth substrate (comprising flakes and soil and/or other natural growth media).

The presence of the polyurethane foam flakes in the plant growth substrate in amounts of 15-60 volume % polyurethane flakes in the plant growth substrate may lead to a crop yield increase up to 200% and higher depending on the cultivar (in particular for water-loving plants such as tomato plants and cucumber plants) when a normal watering is applied compared to growing crops on a control plant growth substrate (soil) without additions of polyurethane flakes. When a 40-75% water reduction is applied, the crop yield grown on a plant growth substrate having 15-60 volume % polyurethane flakes in soil remains 100% compared to a control plant growth substrate (soil) wherein normal watering is applied (depending on the cultivar).

According to embodiments, the amount of polyurethane foam flakes for use in anaerobic conditions in order to reduce the emission of methane ($CH_4$) is ≥20 volume %, preferably ≥40 volume % and most preferably ≥50 volume % calculated as volume flakes on the total volume of plant growth substrate (comprising flakes and soil and/or other natural growth media). More than 50 volume % polyurethane flakes in the soil shows no significant growth difference (e.g. of rice plants) compared to the control soil without additions of polyurethane flakes. When applied in anaerobic conditions the polyurethane flakes may reduce the $CH_4$ production up to 80% when used in a 75 volume % polyurethane flakes (25% soil or other natural growth media remaining) without taking the volume of water into account.

According to embodiments, the use of polyurethane flakes according to the invention in anaerobic conditions may comprise the cultivation of rice in a mixture of polyurethane flakes with water, nutrients and soil. The amounts of water and nutrients are selected in the usual way by those skilled in the art so as to optimize growth of the rice. The nutrients are selected amongst those usually employed like biomass and fertilizers as nitrates and phosphates. The soil is likewise selected from the soil types commonly used. The amount of soil (or other natural growth media) and foam flakes in the plant growth substrate is such that the volume ratio of the foam flakes in the plant growth substrate is ranging from 10:90 to 90:10 (volume %), preferably from 80:20 to 40:60 (volume %) wherein the volume % is calculated as volume flakes on the total volume of plant growth substrate comprising flakes.

The foam flakes according to the present invention may be used untreated or they may be treated, for example the flakes may be provided with a coating comprising additives, like a starch coating, a fertilizer coating, . . . before and/or after crushing or shredding the polyurethane foam according to the invention.

Polyurethane Foam Suitable for Use as Polyurethane Flakes According to the Invention The polyurethane foams suitable for use in plant substrates according to the invention, preferably as polyurethane flakes, must have good water retention characteristics and low swelling at 100% water saturation. The polyurethane foams suitable for use in soil according to the invention hence must have good wetting, water retention and water release properties.

Water uptake and in particular water retention of a polyurethane foam can be measured by determination of pF values (measured volumetric water content retained in the foam when applying a pressure e.g. a pF0 value gives the amount of retained water in the foam after that a pressure of 0 cm $H_2O$ column for 30 minutes was applied to the foam).

The polyurethane foam suitable for use in plant substrates according to the invention may be a flexible polyurethane foam having a density of 25-70 kg/m$^3$, a compression load deflection at 40% (CLD) of 5-15 kPa, a volume increase at water saturation of at most 25% and a water buffer capacity of 40-60% (referred to in this application as Type I polyurethane foam). Preferably the foams have a density of 26-60 kg/m$^3$ and a compression load deflection at 40% (CLD) of 5-12 kPa. More preferably the foams additionally have a volume increase at water saturation of at most 15%. This polyurethane foam is described in WO2011042284 and is incorporated herein by reference.

The type I polyurethane foam suitable for use as polyurethane flakes in plant substrates according to the invention preferably has a $pF_0$ value of at least 60%, preferably in the range 60-80% wherein the $pF_0$ value is measured after subjecting a water saturated foam sample having dimensions of 100×120×75 mm to a pressure of 0 cm $H_2O$ column for 30 minutes.

Table 1 below summarizes typical properties of a foam suitable for making polyurethane flakes according to the invention.

TABLE 1

Typical properties of a type I polyurethane foam suitable for making polyurethane flakes according to the invention.

| Typical properties | Test method | value |
| --- | --- | --- |
| Foam density (kg/m3) | ISO 845 | 29-39 |
| Foam hardness (40% compression measured first cycle) | ISO 3386-1 | 7-12 kPa |

TABLE 1-continued

Typical properties of a type I polyurethane foam suitable for making polyurethane flakes according to the invention.

| Typical properties | Test method | value |
|---|---|---|
| Swell test (Volume increase after 24 h) | | 10-20% |
| Water uptake (grams after 24 h) | | ≥25 |
| pH value | | 6-8 |
| pF0 value | ISO 11274 (*) | 60-80% |
| Water Buffer Capacity (WBC) (pFo-pF1.5) | ISO 11274 | 40-60% |
| Determination microbiological resistance | DIN EN 12225 | 100% |
| Determination oxidation resistance | DIN EN 13438 | 100% |
| Determination chemical resistance | DIN EN 14030 | 100% |

(*) tested on a foam sample 10 × 12 × 7.5 cm

Alternatively the polyurethane foam suitable for use in plant substrates according to the invention may be a polyurethane foam having a resilience of at most 40%, a compression load deflection (CLD) at 40% of at least 16 kPa, a free-rise core density of at least 20 kg/m$^3$, a volume increase at water saturation of at most 25% and a water buffer capacity of at least 40 up to 80% and higher (referred to in this application as Type II polyurethane foam). Preferably the polyurethane foam has a CLD which is at least 20 kPa and more preferably at least 25 kPa, a density which is 20 up to 50 kg/m$^3$, a resilience which is at most 30% and a volume increase at water saturation of at most 20%.

The type II polyurethane foam suitable for use as polyurethane flakes in plant substrates according to the invention preferably has a pF$_0$ value of at least 70%, preferably at least 80%, more preferably at least 90% wherein the pF$_0$ value is measured after subjecting a water saturated foam sample having dimensions of 100×120×75 mm to a pressure of 0 cm H$_2$O column for 30 minutes.

The type II polyurethane foam according to the invention may have a pF$_1$ value in the range of 10% up to 90% wherein the pF$_1$ value is measured after subjecting a water saturated foam sample of 100×120×75 mm to a pressure of −10 cm H$_2$O column for 24 hours.

Preparation Process for a Polyurethane Foam Suitable for Use as Polyurethane Flakes According to the Invention Below process methods are described for making type I and type II polyurethane foams suitable for making polyurethane flakes for use in plant substrates under aerobic and/or anaerobic conditions. These processes are given by way of example but are not intended to limit the invention thereto.

The polyols which may be used as polyol in below cited processes include products obtained by the polymerization of ethylene oxide and propylene oxide in the presence, where necessary, of polyfunctional initiators.

The polyisocyanates which may be used as polyisocyanates or in polyisocyanate prepolymers in below cited processes are known in the art. They are made by the phosgenation of a mixture of polyamines obtained by the acid condensation of aniline and formaldehyde. Examples of suitable commercial available polyisocyanates include for example SUPRASEC® MPR (ex Huntsman, a 4,4'-diphenylmethane diisocyanate) and SUPRASEC® 2185 (ex Huntsman, a polymeric MDI having an NCO value of 30.7% by weight comprising about 37.7% by weight of diisocyanate) and mixtures of said products.

The type I polyurethane foam suitable for use as polyurethane flakes in plant substrates according to the invention may be prepared by a process which comprises reacting at an isocyanate index of 20-70 and at a water index of 200-400 a polyisocyanate prepolymer having an NCO-value of 20-30% by weight and made by reacting a polyisocyanate comprising 30-80% by weight of diphenylmethane diisocyanate (MDI) and 20-70% by weight of homologues of this diisocyanate, the homologues having an isocyanate functionality of 3 or more, the amounts both calculated on the amount of polyisocyanate, and a polyol having an average molecular weight of 62-1000 and an average nominal hydroxyl functionality of 2-4, a polyoxyethylene polyoxypropylene polyol or a mixture of such polyols, the polyol or the mixture having an average nominal hydroxyl functionality of 2-4, an average molecular weight of 2000-8000 and an average oxyethylene content of 25-50% by weight, calculated on the weight of this polyol or mixture respectively, water, and optionally isocyanate-reactive chain extenders and/or cross-linkers having an average molecular weight of 60-1999, and optionally in the presence of auxiliaries and additives used in the polyurethanes art.

The type II polyurethane foam suitable for use as polyurethane flakes in plant substrates according to the invention may be prepared by a process which comprises reacting at an isocyanate index of 90-150, preferably at an index of 95-120, more preferably at an index of around 100-110:

a polyisocyanate and/or prepolymers made of polyisocyanates (having an NCO-value of 10-30%) comprising diphenylmethane diisocyanate (MDI) and homologues thereof having an isocyanate functionality of 3 or more wherein the amount of diisocyanate calculated on the total amount of the diisocyanates and the homologues is 20-80% by weight, preferably 25-70% more preferably 25-55% by weight of MDI and 80-20%, preferably 75-30% and more preferably 75-45% by weight of homologues of MDI, wherein both amounts are calculated on the total amount of polyisocyanate by weight, and a first polyoxyethylene polyoxypropylene polyol having an average nominal hydroxy functionality of 2-6, an average molecular weight of 2000-12000, an oxyethylene content of more than 50% weight calculated on the weight of this polyol, and a second polyoxyethylene polyoxypropylene polyol having an average nominal hydroxy functionality of 2-6, an average molecular weight of 2000-6000, an oxyethylene content of 20-45% by weight calculated on the weight of this polyol, and a water content of 2-7 pbw, and wherein the weight ratio of the first and the second polyol used is ranging from 60:40 to 20:80, preferably ranging from 49:51 to 20:80.

The total oxyethylene content in the first and second polyol in above cited process is preferably lower than 50% by weight calculated on the total weight of the first and second polyether. The first and second polyether polyol may be first mixed to form a stable dispersion of polyether polyols before adding them to the polyisocyanate composition. The first and second polyether polyols are known in the art and/or commercially available. Examples of the first type of polyether polyols are Daltocel® F442, F444 and F555, all ex Huntsman and having an oxyethylene content of more than 60% by weight. An example of the second type of polyether polyol is Jeffol® G11-56 ex Huntsman. Daltocel and Jeffol are trademarks of the Huntsman Corporation or an Affiliate thereof which has been registered in one or more but not all countries.

The polyisocyanates used to make type II polyurethane foam may be made by mixing in appropriate relative amounts SUPRASEC® MPR (ex Huntsman, a 4,4'-diphenylmethane diisocyanate) and SUPRASEC® 2185 (ex Huntsman, a polymeric MDI having an NCO value of 30.7% by weight comprising about 37.7% by weight of diisocyanate). Mixtures of SUPRASEC® 2185 and SUPRASEC® MI 20 (obtainable ex Huntsman), containing about 80 parts by weight of 4,4'-MDI and about 20 parts by weight of 2,4'-MDI and less than 2 parts by weight of 2,2'-MDI may also be used.

Use of a polyisocyanate having a functionality of 3 and more is beneficial in the process for making type II polyurethane foams to obtain high $pF_1$ values ($pF_1$ values>50%) because isocyanates having functionality of 3 and more lead to foams with relatively more closed pores (cell membranes) and have hence better water retention properties.

Further isocyanate-reactive chain extenders and/or cross-linkers having an average molecular weight of 60-1999 may be added to above cited processes for making type I & type II polyurethane foams. Examples of such compounds are butanediol, ethylene glycol, propylene glycol, diethylene glycol, triethylene glycol, dipropylene glycol, ethanolamine, diethanolamine, triethanolamine, cyclohexane dimethanol, glycerol, trimethylolpropane, 1,2,6-hexanetriol, pentaerythritol, sorbitol and polyoxyethylene polyols, polyoxypropylene polyols, polyoxyethylene polyoxypropylene polyols and mixtures thereof having an average molecular weight of about 200, 600 and 1000 and mixtures of such compounds. The amount used of these chain extenders and/or cross-linkers is up to 20 and preferably up to 10 pbw per 100 pbw of the above polyether polyol mixture having an average molecular weight of 2000 and more.

The amount of water (water content) used in the process according to the invention for making type I & type II polyurethane foams is preferably in the range of 2-7 pbw and more preferably in the range of 3.5-6 pbw.

Further a catalyst may be used in the processes for making type I & type II polyurethane foams which enhances the formation of urethane groups. Preferably it is used in an amount of 0.1-2% by weight (on all isocyanate reactive ingredients). Such catalysts are generally known in the art. Examples are amine catalysts, like triethylenediamine, N,N-dimethylethanolamine, bis(N,N-dimethylaminoethyl)ether, 2-(2-dimethylaminoethoxy)ethanol, N,N,N'-trimethyl-N'-hydroxyethylbisamino ethyl-ether, N-(3-dimethylaminopropyl)-N,N-diisopropanolamine, N,N'-diethylpiperazine and 1-(bis(3-dimethyl-aminopropyl)amino-2-propanol and organometallic compounds like stannous octoate and dibutyltin dilaurate. Mixtures of catalysts may be used as well.

Optionally the type I & type II polyurethane foams according to the invention may be made in the presence of additives and auxiliaries used in the polyurethanes art, like fire retardants, surfactants, other blowing agents, smoke-suppressants, colouring agents, carbon black, anti-microbial agents, anti-oxidants, mould release agents, fillers and fertilizers.

The type I & type II polyurethane foams according to the invention are made by combining and mixing all ingredients and allowing the reaction to take place. The foams may be made according to a free rise process, a moulding process, a slabstock process, a lamination process or a spray process. When the foams are made in a mould, an overpack of at most 100%, preferably at most 50% is used. When using a moulding process, the foams may show an advantageous morphology: when two pieces of the same foam are placed upon each other, both saturated with water, then the lower piece will absorb less of the water from the upper foam than a prior art foam made without this overpack.

The ingredients used to fabricate type I & type II polyurethane foams according to the invention may be fed independently to the mixing head of a foaming machine. Preferably the isocyanate reactive ingredients are premixed, optionally together with the additives and auxiliaries used in the polyurethanes art, before they are mixed with the polyisocyanate.

EXAMPLES

The invention is further illustrated with the following experiments and examples.

Experiment 1: Cultivation of Rice

A polyurethane foam was made as follows.

Polyisocyanate was reacted with a mixture of 7.9 pbw of Daltocel F442, 47.5 pbw of Daltocel® F489, 0.6 pbw of Jeffcat® DPA and 0.05 pbw of Jeffcat® ZF-10 (being obtainable from Huntsman; Daltocel® and Jeffcat® are trademarks of the Huntsman Corporation or an affiliate thereof which has been registered in one or more but not all countries) and 0.25 pbw of Tegostab® B 8724 LF (a surfactant ex Evonik) and 5.1 pbw of water at an isocyanate index of 39.5 and a water index of 280.

The polyisocyanate used was a prepolymer obtained by reacting 54 pbw of Suprasec® 2185 and 36 pbw Suprasec® MPR (polyisocyanates ex Huntsman) and 10 pbw of Polyol 3380 (a polyoxyethylene triol ex Perstorp having an OH value of 382 mg KOH/g) and having an NCO value of about 25.9% w.

The foam had a density of about 30 kg/m³, a CLD at 40% of 8.4 kPa, a volume increase at water saturation of about 17% and a WBC of about 67%.

The foam so obtained was cut in flakes having an average particle size of at most 25 mm (mesh sieve).

Rice was cultivated as follows (example 1 which is a comparative example not using foam): in a rectangle container of 100*100*15 cm, a soil layer of 12 cm humus was applied and on top of the humus a layer of about 1 cm clay. The soil was flooded with 2 cm of water and 500 rice seeds were sown. The sun-light was mimicked with a Bio Green plant light Sirus X400 (UV lamp) and Tansun RIO IP infrared heater of 2000 W. The UV lamp was used for 12 hours per day.

In another cultivating example (example 2) the soil was replaced with a mixture of the same soil and the above flakes of polyurethane foam in a 25/75 volume ratio. This cultivating example was conducted concurrently with the previous one.

During the cultivation period the amount of emitted methane was measured in a way similar to the method described in Acta Meteorologica Sinica (1990) Vol. 4, No. 3, pages 265-275. In example 1 the amount of emitted methane was about 9 times higher than the amount in example 2.

Experiment 2: Addition of Polyurethane Flakes to Soil and Effect on Yield of Tomato Plants Grown on that Soil The main purpose of the study is to determine the plant yield and reduction of water usage (irrigation) when using various concentrations of flakes in soil according to the invention (made using Type I polyurethane foam). To set up that experiment different plots were set up thereby using different amounts (vol %) of flakes in soil and different amounts of soil (depth profile) treated with flakes according to the invention.

The main characteristics of the soil that was used in this field experiments was soil which has the following composition:
- 38% of silt (2-50 µm);
- 42% of clay (0-2 µm);
- 20% of sand (50-2000 µm).

For each plot (sample), the following five steps were undertaken:
- Remove a layer of 10 cm of soil and put it aside for use as UV protective layer,
- Enlighten the soil using a "motoculteur" up to the depth corresponding to the amount of soil to be mixed with the flakes;
- Take such enlightened soil into a mixer ("bétonnière");
- Add the required volume/weight of flakes into the mixer, slightly watered to avoid it to be blown away by the wind;
- Mix both components;
- Spread out homogeneously the obtained mix over the relevant plot;
- Cover the plot with a 10 cm thick UV protective layer using the soil put aside (step 1).

Figure 1:
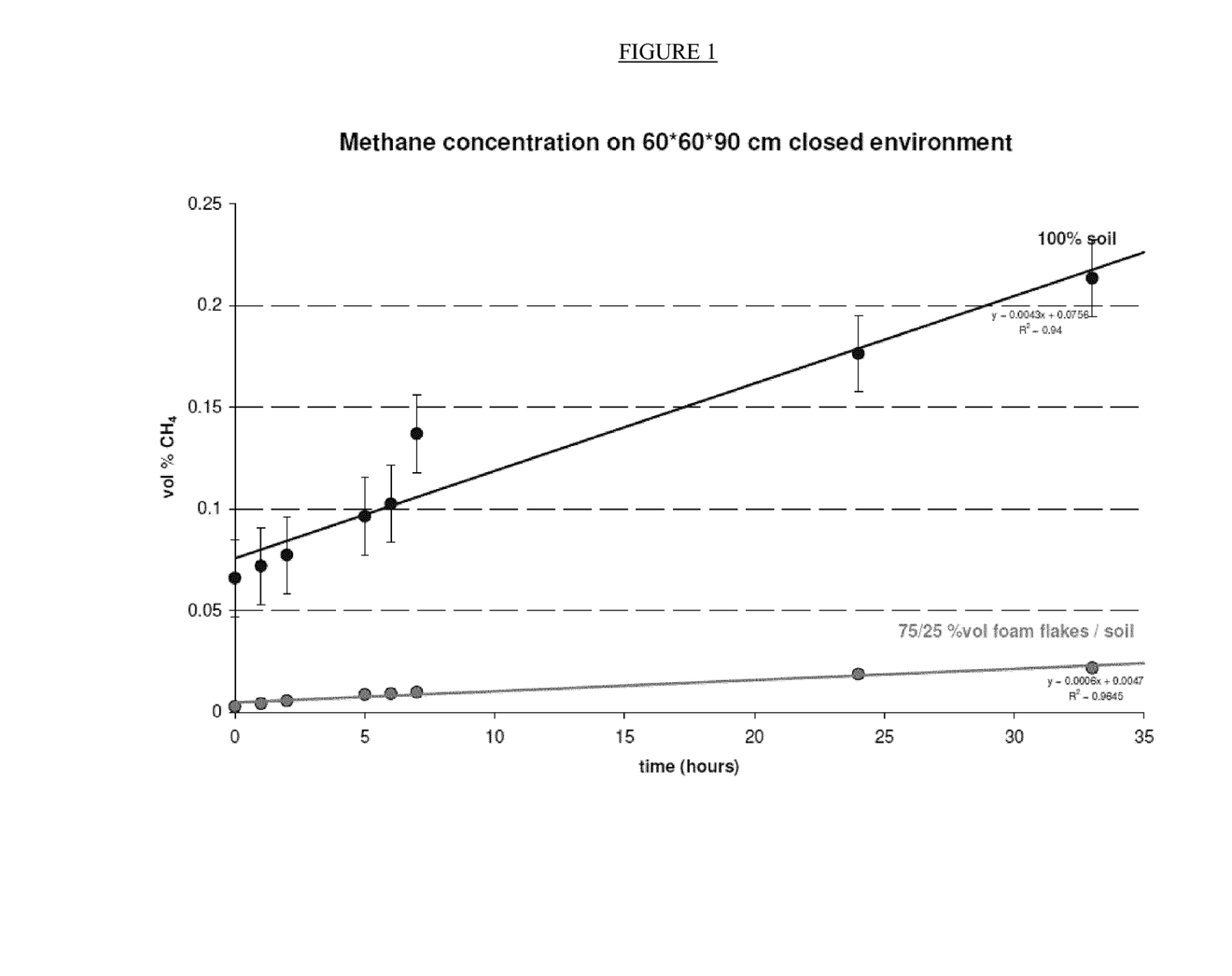
FIG. 1 illustrates the reduction of methane gas emission when growing rice plants according to the invention whereby 75 vol % polyurethane flakes according to the invention are added to soil compared to the methane gas emission when growing rice plants on soil without addition of polyurethane flakes.
Figure 2:
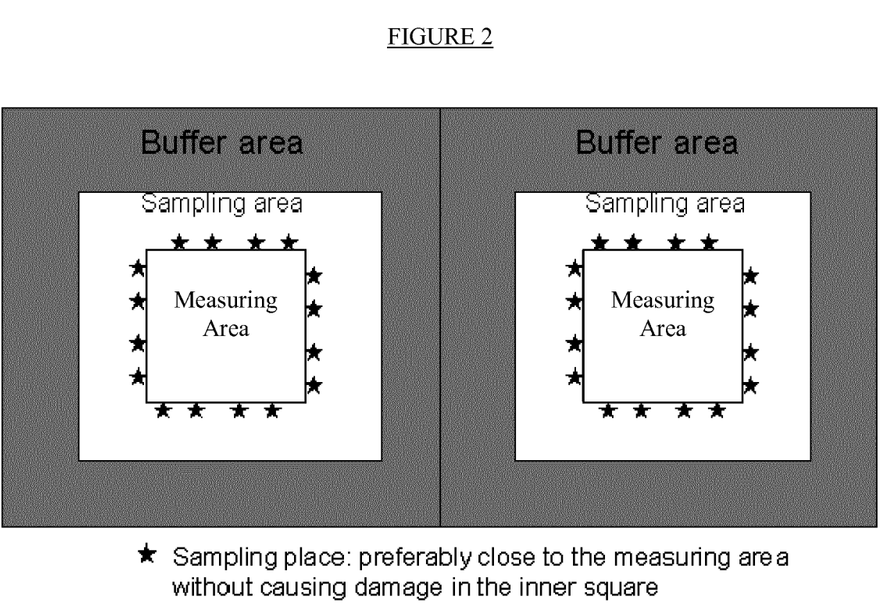
FIG. 2 illustrates the set up of a plot according to experiment 2.

To simplify the layout, the different plots were organised into an array of 12 columns by 15 rows. The plots had dimensions of 16 $m^2$ large and should be separated by a buffer of around 2 m in both directions (FIG. 2 illustrates the set up of a plot). Within each plot there are 3 areas:
1. The «Buffer area» is the area that is not used for the experiment but used to separate the different plots from each other. This area will have no flakes inserted in the soil.
2. The «Sampling area» is where samples of soil and crops will be taken, preferably close to the border with the «Measuring area» in order not to disturb the real measuring area for yield and other parameters. This area will have additions of flakes in the soil and an irrigation regime as described by the model.
3. The «Measuring area» is where the measure of yield and other parameters will be performed. This area will have the additions of flakes to the soil and an irrigation regime as described by the model.

An irrigation system was installed thereby taking the irrigation requirement for each plot into account. Irrigation will be performed via "drop-by-drop" method using pipes pierced with small holes and one valve per irrigation zone (21 such zones are defined). The quantity of water is measured by a flow meter installed on the main pipe. All valves will be opened at the same time and switched off when the expected amount of water has been supplied to each individual irrigation zone. In order to facilitate the installation and control of the irrigation system, plots requiring the same level of irrigation have been aligned side by side.

Tomato plants were planted into each plot. All tomato plants are 10-12 cm high and 2 weeks old when they were planted in the soil. During the first 2-3 weeks, irrigation was performed with 100% of optimal water supply on ALL plots in order to make sure that the plants develop a root system. After that, irrigation on the different plots was performed as prescribed in the irrigation requirement table below (Table 2). Table 3 summarizes the amount (vol %) of flakes according to the invention added to the soil in each plot.

TABLE 2 irrigation requirement per plot in experiment 2.

| | A | B | C | D | E | F | G | H | I | J | K | L |
|---|---|---|---|---|---|---|---|---|---|---|---|---|
| 1 | 20% | 20% | 20% | 35% | 35% | 35% | 35% | 35% | 35% | 20% | 20% | 20% |
| 2 | 35% | 35% | 35% | 60% | 60% | 60% | 60% | 60% | 60% | 35% | 35% | 35% |
| 3 | 60% | 60% | 60% | 60% | 60% | 60% | 60% | 60% | 60% | 60% | 60% | 60% |
| 4 | 85% | 85% | 85% | 85% | 85% | 85% | 85% | 85% | 85% | 85% | 85% | 85% |
| 5 | 100% | 100% | 100% | 100% | 100% | Spare | 100% | 100% | 100% | 100% | 100% | spare |
| 6 | Spare | 100% | 100% | 100% | 100% | 100% | 100% | 100% | 100% | 100% | 100% | Spare |
| 7 | 85% | 85% | 85% | 85% | 85% | 85% | 85% | 85% | 85% | 85% | 85% | 85% |
| 8 | 60% | 60% | 60% | 60% | 60% | 60% | 60% | 60% | 60% | 60% | 60% | 60% |
| 9 | 35% | 35% | 35% | 60% | 60% | 60% | 60% | 60% | 60% | 35% | 35% | 35% |
| 10 | 20% | 20% | 20% | 35% | 35% | 35% | 35% | 35% | 35% | 20% | 20% | 20% |
| 11 | 20% | 20% | 20% | 35% | 35% | 35% | 35% | 35% | 35% | 20% | 20% | 20% |
| 12 | 35% | 35% | 35% | 60% | 60% | 60% | 60% | 60% | 60% | 35% | 35% | 35% |
| 13 | 60% | 60% | 60% | 60% | 60% | 60% | 60% | 60% | 60% | 60% | 60% | 60% |
| 14 | 85% | 85% | 85% | 85% | 85% | 85% | 85% | 85% | 85% | 85% | 85% | 85% |
| 15 | 100% | 100% | 100% | 100% | 100% | spare | Spare | 100% | 100% | 100% | 100% | 100% |

TABLE 3 volume % flakes added to the soil in each plot in experiment 2.

|    | A     | B   | C   | D   | E   | F     | G     | H   | I   | J   | K   | L     |
|----|-------|-----|-----|-----|-----|-------|-------|-----|-----|-----|-----|-------|
| 1  | —     | 40% | —   | 55% | —   | 25%   | —     | 25% | 55% | —   | 40% | —     |
| 2  | 55%   | —   | 25% | 40% | 40% | 15%   | 40%   | 40% | —   | 25% | —   | 55%   |
| 3  | 40%   | —   | 65% | 40% | 40% | —     | 40%   | —   | 65% | 40% | 15% | 40%   |
| 4  | 55%   | —   | 25% | 55% | —   | 25%   | —     | 55% | 55% | 25% | —   | 25%   |
| 5  | 40%   | —   | 40% | 75% | —   | Spare | 65%   | —   | 40% | 65% | —   | spare |
| 6  | Spare | 40% | —   | 40% | 75% | —     | 40%   | —   | 75% | 40% | —   | Spare |
| 7  | 55%   | —   | 25% | 55% | —   | 25%   | —     | 55% | 55% | 25% | —   | 25%   |
| 8  | 40%   | —   | 65% | 40% | 40% | —     | 40%   | —   | 65% | 40% | 15% | 40%   |
| 9  | 55%   | —   | 25% | 40% | 40% | 15%   | 40%   | 40% | —   | 25% | —   | 55%   |
| 10 | —     | 40% | —   | 55% | —   | 25%   | —     | 25% | 55% | —   | 40% | —     |
| 11 | —     | 40% | —   | 55% | —   | 25%   | —     | 25% | 55% | —   | 40% | —     |
| 12 | 55%   | —   | 25% | 40% | 40% | 15%   | 40%   | 40% | —   | 25% | —   | 55%   |
| 13 | 40%   | —   | 65% | 40% | 40% | —     | 40%   | —   | 65% | 40% | 15% | 40%   |
| 14 | 55%   | —   | 25% | 55% | —   | 25%   | —     | 55% | 55% | 25% | —   | 25%   |
| 15 | —     | 65% | —   | 40% | 65% | spare | Spare | 40% | —   | 75% | 40% | —     |

Table 4 below summarizes the results of experiment 2. Each value in the table corresponds to the yield of tomatoes on the tomato plants (weight of fruit only=tomato yield)

TABLE 4

Summary of the results from experiment 2. The average yield is a result of several measurements on plots with the same irrigation conditions.

|                       | 100% ETM | | 85% ETM | | 60% ETM | | 35% ETM | | 20% ETM | |
|---|---|---|---|---|---|---|---|---|---|---|
|                       | With flakes | No flakes | With flakes | No flakes | With flakes | No flakes | With flakes | No flakes | With flakes | No flakes |
| Average Yield (T/ha)  | 85.7 | 42.0 | 50.2 | 36.3 | 41.3 | 31.7 | 31.8 | 23.7 | 24.1 | 17.3 |
| Irrigation (mm)       | 603  | 603  | 500  | 500  | 399  | 399  | 248  | 248  | 202  | 202  |

Figure 3:
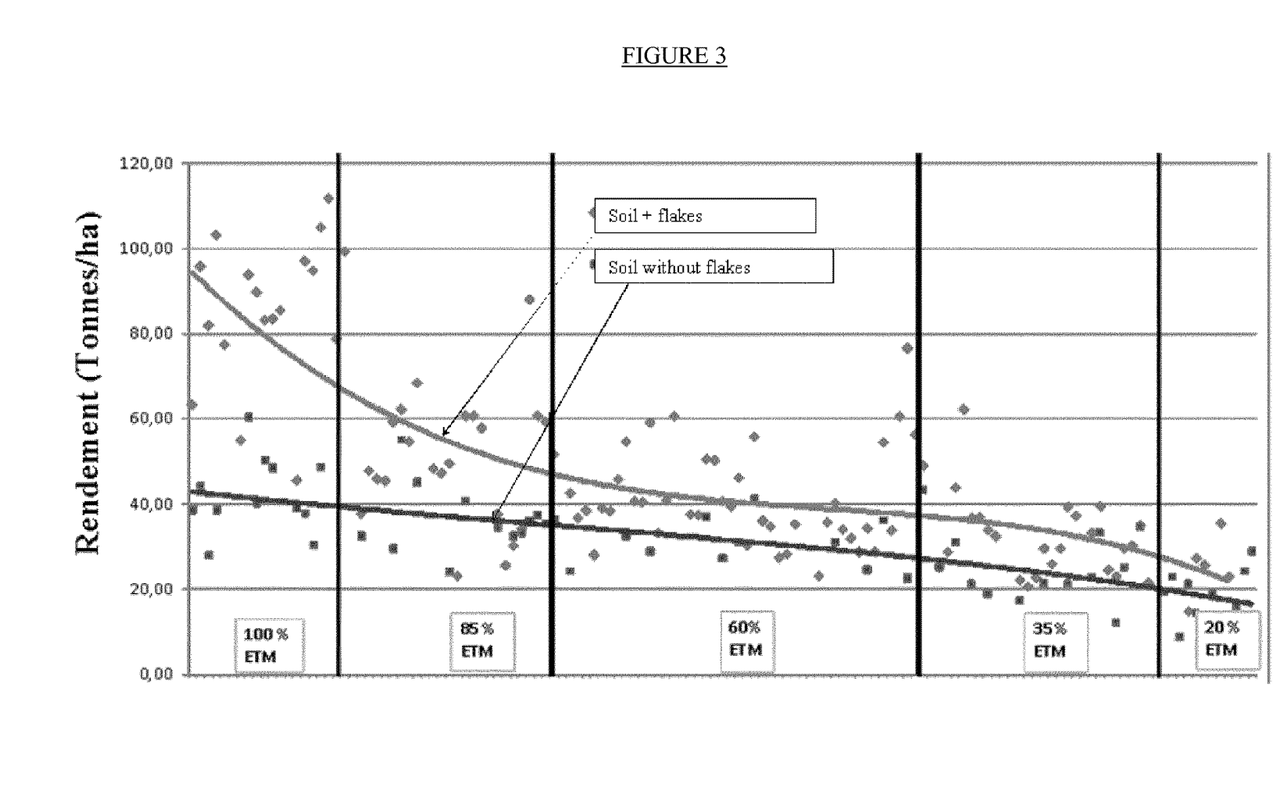
FIG. 3 illustrates the effect of different water regimes on the yield of plants grown on plant substrates with additions of polyurethane flakes compared to the effect of different water regimes on the yield of plants grown on plant substrates without additions of polyurethane flakes.

FIG. 3 illustrates the effect of different water regimes on the yield of plants grown on soil with additions of polyurethane flakes compared to the yield of plants grown on soil without additions of polyurethane flakes. In other words, this graph indicates that when using the same amount of watering (100% ETM) an increase of yield of approximately 200% could be achieved when adding flakes into the soil. When adding the flakes according to the present invention to soil a drop of watering of 60% ETM and a similar yield could be achieved compared to the reference soil without addition of flakes (whereby the soil without addition of flakes had a watering of 100% ETM).

Figure 4:
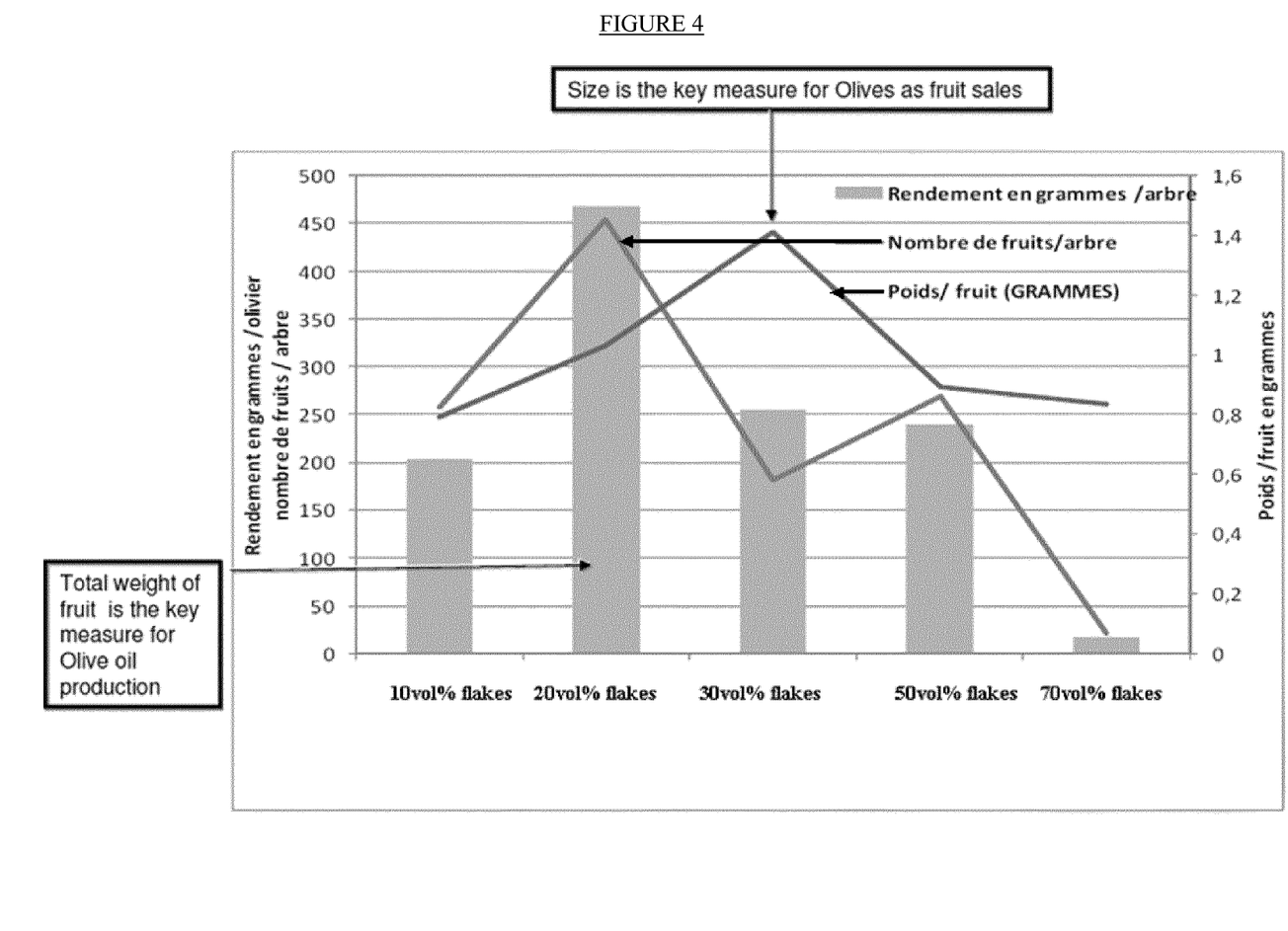
FIG. 4 illustrates the yield and growth results obtained for olive plants grown on plant substrates with varying additions of polyurethane flakes according to the invention.

Experiment 3: Effect of Addition of Polyurethane Flakes to Soil on the Yield of Olives on Olives Trees FIG. 4 illustrates the results of the effect of adding polyurethane flakes according to the invention to the soil on the yield of olives.

Additions of 20 volume % polyurethane flakes according to the invention to soil (calculated as volume flakes/volume flakes+soil) results in optimal yields (giving the highest number of olives). An amount of 20 volume % polyurethane flakes seems to stimulate the production of olives, a maximum number of olives was achieved with amounts of 20 volume % polyurethane flakes in soil while bigger fruit (but smaller amount) was achieved with amounts of 30 volume % polyurethane flakes in soil.

The invention claimed is:

1. A plant growth substrate comprising:
   soil and/or other natural growth media, and
   polyurethane foam flakes as an additive;
   wherein the polyurethane foam flakes have a density of 25-100 kg/m$^3$, a compression load deflection (CLD) at 40% of 5-50 kPa, a volume increase at water saturation of at most 25% and a water buffer capacity of 35-80%, wherein the polyurethane foam flakes have dimensions in the range 0.1-100 mm, and wherein the polyurethane foam flakes are present in the plant growth substrate in an amount ranging from 15 to 60 volume % where the volume % is calculated as the volume of polyurethane foam flakes in the total volume of plant growth substrate comprising the polyurethane foam flakes when the soil and/or other natural grown media are under aerobic conditions.

2. The plant growth substrate according to claim 1, wherein the polyurethane foam flakes have a CLD in the range 5-15 kPa, a free-rise core density of 25 up to 70 kg/m$^3$, and a water buffer capacity of 40-60%.

3. The plant growth substrate according to claim 1, wherein the polyurethane foam flakes have a CLD of at least 20 kPa, a free-rise core density of 20 up to 50 kg/m$^3$, a resilience of at most 30% and the volume increase at water saturation is at most 20%.

4. The plant growth substrate according to claim 1, wherein the polyurethane foam flakes have a resilience of at most 40%, a compression load deflection (CLD) at 40% of at least 16 kPa, a free-rise core density of at least 20 kg/m³, and a volume increase at water saturation of at most 25%.

5. The plant growth substrate according to claim 1, wherein the polyurethane foam flakes have dimensions in the range of 1-50 mm.

6. The plant growth substrate according to claim 1, wherein the polyurethane foam flakes are coated with fertilizers or hardeners.

7. The plant growth substrate according to claim 1, wherein the polyurethane foam flakes have dimensions in the range of 1-50 mm.

8. The plant growth substrate according to claim 1, wherein the polyurethane foam flakes are coated with fertilizers or hardeners.

9. A plant growth substrate comprising:
  soil and/or other natural growth media, and
  polyurethane foam flakes as an additive;
wherein the polyurethane foam flakes have a density of 25-100 kg/m³, a compression load deflection (CLD) at 40% of 5-50 kPa, a volume increase at water saturation of at most 25% and a water buffer capacity of 35-80%, wherein the polyurethane foam flakes have dimensions in the range 0.1-100 mm, and wherein the amount of soil and/or other natural growth media to polyurethane foam flakes in the plant growth substrate has a volume ratio ranging from 10:90 to 90:10 volume % where the volume % is calculated as the volume of polyurethane foam flakes in the total volume of plant growth substrate comprising the polyurethane foam flakes when the soil and/or other natural grown media are under anaerobic conditions.

10. The plant growth substrate according to claim 9, wherein the polyurethane foam flakes have a CLD in the range 5-15 kPa, a free-rise core density of 25 up to 70 kg/m³, and a water buffer capacity of 40-60%.

11. The plant growth substrate according to claim 9, wherein the polyurethane foam flakes have a CLD of at least 20 kPa, a free-rise core density of 20 up to 50 kg/m³, a resilience of at most 30% and the volume increase at water saturation is at most 20%.

12. The plant growth substrate according to claim 9, wherein the polyurethane foam flakes have a resilience of at most 40%, a compression load deflection (CLD) at 40% of at least 16 kPa, a free-rise core density of at least 20 kg/m³, and a volume increase at water saturation of at most 25%.

* * * * *